UNITED STATES PATENT OFFICE.

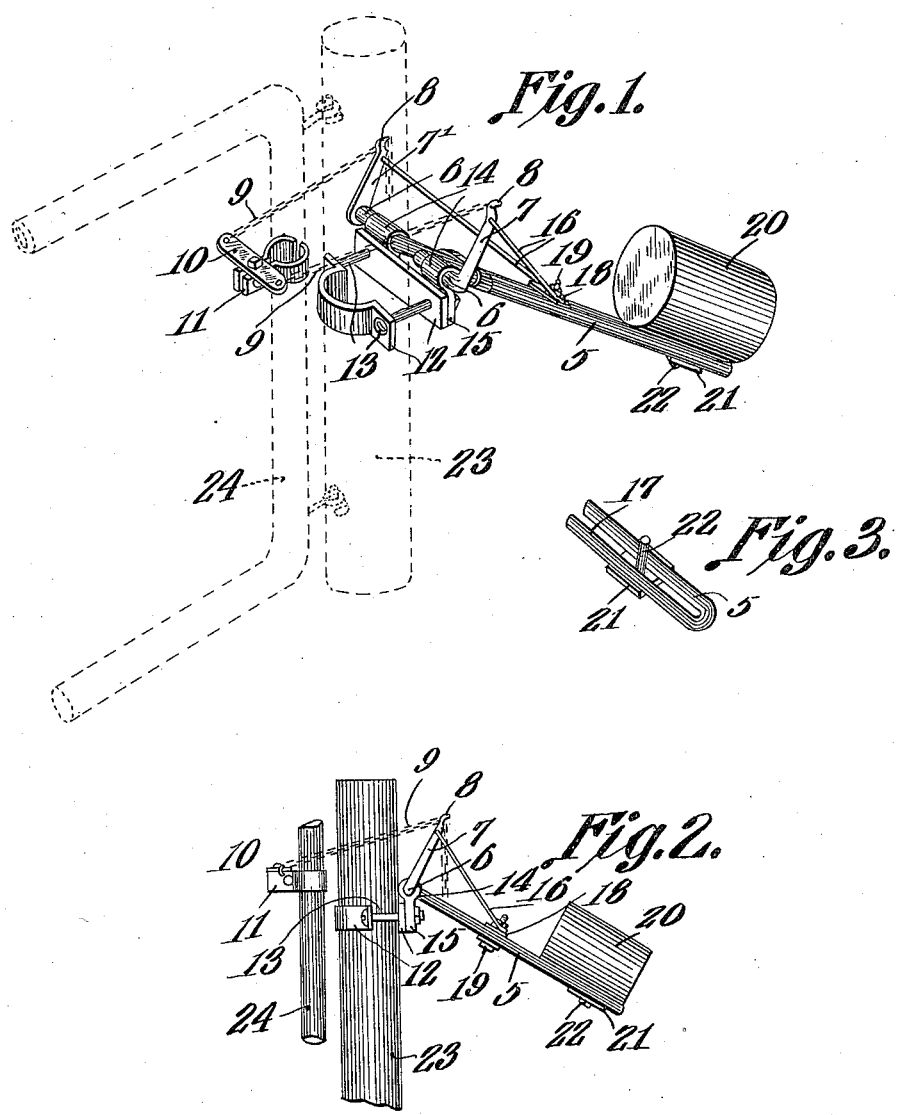

JACOB C. MUNSON, OF PONTIAC, ILLINOIS.

GATE ATTACHMENT.

1,043,960.

Specification of Letters Patent.

Patented Nov. 12, 1912.

Application filed May 6, 1912. Serial No. 695,495.

*To all whom it may concern:*

Be it known that I, JACOB C. MUNSON, a citizen of the United States, residing at Pontiac, in the county of Livingston and State of Illinois, have invented a new and useful Gate Attachment, of which the following is a specification.

This invention relates to gates, and resides in a novel attachment which is designed so as to permit the gate to swing open in either direction and to return the gate to normal position after the same has been swung open.

The present invention aims to produce a device of this character which shall be simple, and inexpensive in construction, which shall be convenient and efficient in use, and which may be readily applied to various gate structures without encumbering the gate or adjacent parts.

With the foregoing and other objects in view, which will be apparent as the invention is better understood, this invention resides in the novel construction and combination of parts hereinafter described and particularly pointed out in the appended claims, it being understood that this device is susceptible of alterations or deviations in its details within the scope of the appended claims without departing from the spirit of the invention.

The invention has been illustrated in its preferred embodiment in the accompanying drawings, wherein similar reference characters have been employed to denote corresponding parts, and wherein—

Figure 1 is a perspective view of the attachment as in use, the gate and the post to which it is hinged being shown in dotted lines. Fig. 2 is a side elevation thereof. Fig. 3 is a fragmental perspective.

Referring specifically to the drawings, the numeral 23 designates a post to which the gate 24 is hinged, which parts may be of any desired construction, the present attachment being applicable to various forms of gates and the gate may be hinged to the post 23 in any suitable manner.

In carrying out the present invention, a lever 5 is pivoted to the post and is connected to the gate in a novel manner so as to permit the gate to swing open in either direction, said lever being weighted in order that when the gate is opened in either direction, the gravitation of the lever will swing the gate to normal or closed position after the gate has been released. The lever 5 is constructed from a rod or bar doubled upon itself to provide a slot 17 running lengthwise of the lever, the ends of the arms being bent outwardly or angularly to provide the pintles 6, the said pintles 6 having the arms 7 and 7' projecting upwardly from their outer ends. This lever 5 is pivoted to the post 23 by means of a pair of clamps 12 engaged to the post 23 by means of the bolts 13, and bearings 14 engaging the pintles 6 and having ears 15 engaging the bolts 13 so that the pintles 6 are journaled through the bearings 14. The lever 5 is arranged between the bearings 14 and the pintles 6 project outwardly through the bearings 14, the arms 7 and 7' being arranged outside of the bearings 14 and at the respective sides of the post 23. The arm 7' is preferably detachable from the corresponding pintle 6, and the arms 7 and 7' are provided with hooks 8 at their free ends. A pair of clamping members 18 are arranged on the upper and lower sides of the lever 5 and are connected by a bolt 19 which passes through the slot 17, and the upper clamping member 18 is connected with the free ends of the arms 7 and 7' by the braces 16, so as to provide for a substantial structure. A weight 20, which may be molded from concrete or cast from metal, or which may be otherwise constructed, is mounted on the lever 5 and carries a bolt 22 which passes through the slot 17, a clamping plate 21 being mounted on the lower end of the bolt 22 in order to clamp the weight 20 at any adjusted position to which it is set.

The clamp 11 is engaged to the upright or stile of the gate adjacent the post 23 and carries a lateral bar 10 providing an arm projecting from each side of the gate, a chain, cable or other flexible member 9 being attached to each arm of the bar 10. The chains 9 may be engaged to the hooks 8 of the arms 7 and 7' on the respective sides, and ordinarily, the lever 5 in being swung downward by the gravitation of the weight 20 causes the chains 9 to be drawn taut so as to retain the gate in normal or closed position. It will therefore follow, that when the gate is swung open in either direction, the chain 9 on the corresponding side will be slackened and the chain on the other side will be drawn with the gate so as to swing the lever 5 and the weight 20 upwardly. The weight 20 in gravitating will therefore return the gate 24 to normal or closed position when the gate is released after being opened. In this manner, the gate may be readily opened by moving same against the tension created by the weight 20, and when the gate is released, the same will be swung to normal or closed position by the weighted lever 5. By adjusting the lengths of the chains 9, which is accomplished by engaging the various links of the chains with the hooks 8, the gate 24 may be normally held at any angle relative to the post 23, in order that when the gate is swung, the same may be returned to any predetermined position.

The present invention is comparatively simple in construction and may be constructed at a comparatively small expense, and is convenient and efficient in use, as well as being compact so as to unencumber the gate or any adjacent part. The various parts of the attachment may be constructed from various suitable materials, may be made in various sizes and proportions, and may be otherwise altered within the scope of the appended claims so as to render the attachment applicable to various forms of gate structures.

Having described the invention, what is claimed as new is:—

1. The combination with a post and a gate hinged thereto, of a weighted lever pivoted to the post and having upstanding arms at the sides of the post, and flexible members adjustably connecting the sides of the gate and the said arms so that the gate may swing in either direction and may be returned to a predetermined normal position.

2. The combination with a post and a gate hinged thereto, of a weighted lever pivoted to the post, and having upstanding arms at the sides of the post, a bar carried by the gate to provide arms at the sides of the gate, and flexible members connecting the respective former and latter arms in order to return the gate to normal position when opened in either direction.

3. The combination with a post and a gate hinged thereto, of a clamp secured to the post, a pair of bearings carried by the clamp, a lever arranged between the bearings and having pintles journaled through the bearings and having arms projecting from the outer ends of the pintles, a weight adjustable on the lever, a bar carried by the gate to provide arms at the sides of the gate, and flexible members connecting the respective former and latter arms in order to return the gate to normal position when opened in either direction.

4. The combination with a post and a gate hinged thereto, of a weighted lever pivoted to the post, and flexible members adjustably connecting the sides of the gate and the said lever so that the gate may swing in either direction and may be returned to a predetermined normal position.

5. The combination with a post and a gate hinged thereto, of a weighted lever pivoted to the post, and having arms at the sides of the post, the said arms having hooks at their free ends, a bar carried by the gate to provide arms at the sides of the gate, and chains connected to the arms of the said bar and engaging the respective aforesaid hooks.

In testimony that I claim the foregoing as my own, I have hereto affixed my signature in the presence of two witnesses.

JACOB C. MUNSON.

Witnesses:
E. A. SIMMONS,
C. R. TOMBAUGH.

---

Copies of this patent may be obtained for five cents each, by addressing the "Commissioner of Patents, Washington, D. C."